(12) United States Patent
Betzen

(10) Patent No.: US 8,931,436 B2
(45) Date of Patent: Jan. 13, 2015

(54) ELECTRODE DESIGN FOR DEER REPELLANT DEVICE

(71) Applicant: Keith M. Betzen, Unionville, IN (US)

(72) Inventor: Keith M. Betzen, Unionville, IN (US)

( * ) Notice: Subject to any disclaimer, the term of this patent is extended or adjusted under 35 U.S.C. 154(b) by 0 days.

(21) Appl. No.: 13/826,478

(22) Filed: Mar. 14, 2013

(65) Prior Publication Data

US 2013/0192537 A1     Aug. 1, 2013

Related U.S. Application Data

(63) Continuation-in-part of application No. 13/135,426, filed on Jul. 5, 2011, now abandoned.

(51) Int. Cl.
*A01K 15/00*     (2006.01)
*A01M 29/24*     (2011.01)
*A01K 15/02*     (2006.01)

(52) U.S. Cl.
CPC .............. *A01M 29/24* (2013.01); *A01K 15/029* (2013.01); *Y10S 119/908* (2013.01)
USPC .......................................... 119/712; 119/908

(58) Field of Classification Search
USPC ......... 119/712, 719, 908; 43/98, 17.1; 52/101
See application file for complete search history.

(56) References Cited

U.S. PATENT DOCUMENTS

| | | | | |
|---|---|---|---|---|
| 5,095,646 | A | * | 3/1992 | Bunkers ............................ 43/98 |
| 5,528,858 | A | * | 6/1996 | Omdahl ............................ 47/84 |
| 5,894,818 | A | * | 4/1999 | Betzen .......................... 119/712 |
| 6,014,951 | A | * | 1/2000 | Betzen .......................... 119/712 |
| 6,264,173 | B1 | * | 7/2001 | Badger et al. ................... 256/10 |
| 6,550,428 | B2 | * | 4/2003 | Betzen .......................... 119/712 |
| 6,779,490 | B1 | * | 8/2004 | Betzen .......................... 119/712 |
| 2004/0244722 | A1 | * | 12/2004 | Scharenberg et al. ........ 119/712 |

* cited by examiner

*Primary Examiner* — Kimberly Berona
(74) *Attorney, Agent, or Firm* — Barnes & Thornburg LLP.

(57) ABSTRACT

An improved electrode design is provided for a baited, shock-producing, deer repellent device deployed in an area to be protected. This device has straight, parallel, positive and negative, un-insulated metal electrodes extending vertically from the top. The electrodes are spaced and sized so that they surround and protect the bait. This electrode design increases the chance that a deer will make effective contact with the electrodes while also allowing easy access to the bait for servicing. This electrode design also decreases the chances of the device collecting ice or snow, and it decreases the chance of discharge of the device by moisture or by contact between the electrodes.

16 Claims, 3 Drawing Sheets

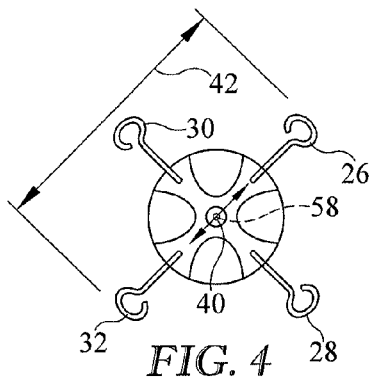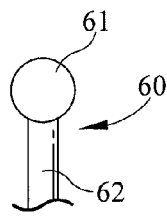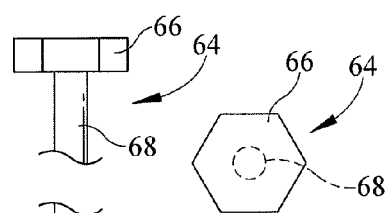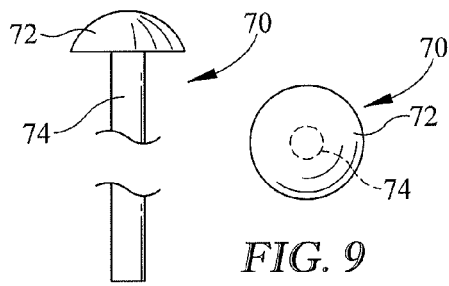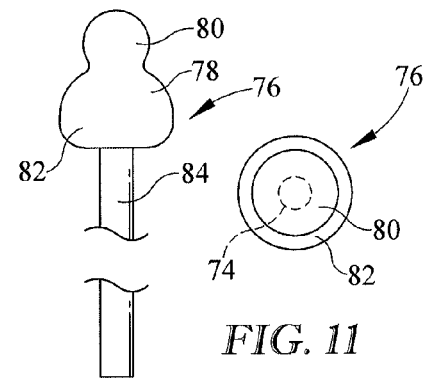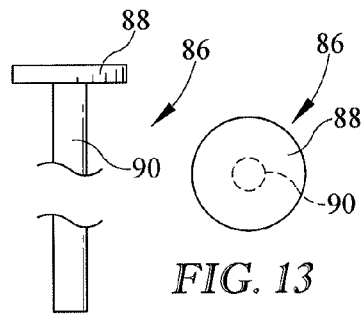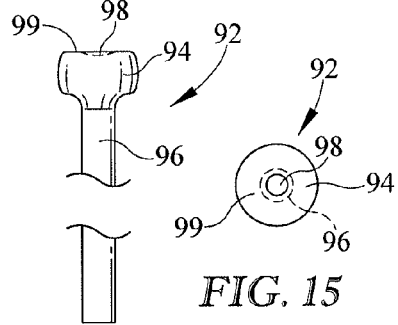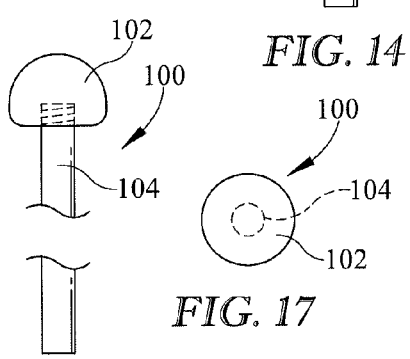

ELECTRODE DESIGN FOR DEER REPELLANT DEVICE

CROSS-REFERENCE TO RELATED APPLICATIONS

This application is a continuation-in-part application of, and claims priority under 35 U.S.C. §120 to U.S. application Ser. No. 13/135,426, filed Jul. 5, 2011, which is expressly incorporated by reference herein.

BACKGROUND

This application relates to animal repellent devices; it relates particularly to a baited, shock-producing deer repellent device having an improved electrode design.

Various electrode designs have been described for shock-producing animal deterrent devices.

U.S. Pat. No. 922,377 to Ames (1909), French Patent 440,270 to Calvert (1912), and Swiss Patent 82,560 to Baumann (1919) show extermination devices for small animals with the electrodes being arranged essentially in the same plane.

U.S. Pat. No. 4,630,571 to Palmer (1986) shows an animal training device with the outer conductive case of the device being one electrode and the stake to the earth being the other.

U.S. Pat. No. 5,894,818 to Betzen (1999) describes a baited, shock-producing deer repellent device in which the electrodes are short projections above the top surface of the device.

An electrode design for use in a baited, shock-producing deer repellent device must surround the bait and protect the bait from being touched by the deer without first contacting the electrodes. If a deer touches the bait before contacting the electrodes, it will realize the bait is artificial, and the deer will then ignore the device, but it will not avoid the area to be protected where the devices are deployed.

None of these prior art devices provides an electrode design that surrounds the bait and protects it from an approach from the top and sides.

U.S. Pat. No. 6,014,951 to Betzen (2000) describes a baited, shock-producing deer repellent device with two circular, crisscrossing electrodes. With this design the distance between the electrodes varies widely. The very small distance between the electrodes at the crossing point causes the device to be easily discharged by a drop of water or by contact between the electrodes with even the slightest distortion. The very short circuit path at this top point may result in a greatly diminished effect on the deer, or the device might be completely discharged by the deer's saliva with no effect at all on the deer. On the other hand, the relatively very large distance between the electrodes at the sides of this device results in a decreased chance that the deer will contact two electrodes simultaneously. Using this design, the optimal distance between the electrodes cannot be maintained, resulting in an increased possibility that the deer will not effectively contact the electrodes and receive a shock. Also, these crisscrossing electrodes block easy access to the bait in the center of the electrodes, making it difficult to service the bait, and the horizontal aspect at the top of these electrodes tends to collect snow and ice and discharge the device.

Woodstream Corp., Lititz, Pa., manufactures a baited, shock-producing deer repellent device called the Havahart Electronic Repellent for Deer, which has two sets of semicircular, crisscrossing electrodes. This design has all of the disadvantages of the device described by Betzen (2000), but it has an even greater chance of contact between the electrodes with distortion of the wires or by droplets of water because there are four crossing points. Also, this electrode design has an increased chance for ice and snow accumulation.

U.S. Pat. No. 6,550,428 to Betzen (2003) describes a baited, shock-producing deer repellent device with a series of parallel semicircular, electrodes arranged and sized to form an approximate hemisphere to surround the bait. While this design eliminates the crossing points, the horizontal aspect of these multiple electrodes block access to the center making it difficult to service the bait and increases the chance for accumulation of snow and ice on the device.

U.S. Pat. No. 6,779,490 to Betzen (2004) describes a baited, shock-producing deer repellent device with an insulator to keep the circular electrodes from contacting each other at the crossing point. With this insulator the distance between the electrodes at the crossing point remains very small, and moisture will discharge the device as it covers the surface of the insulator. This insulator increases the chance for snow and ice accumulation on top of the device and further blocks access to the center of the electrodes for servicing the bait. Also, this insulator further decreases chances of the deer making effective contact with the electrodes at the top of the device.

Therefore it can be seen that all of the prior art devices disclosed herein suffer from disadvantages that limit their effectiveness.

An electrode design for a baited, shock-producing deer repellent device should surround and protect the bait from an approach from the top and sides and provide a maximum chance that the deer will effectively contact the electrodes. The electrodes should have a uniform optimal distance between them to provide an ample and consistent circuit path while being close enough to facilitate effective contact with the deer. The electrodes should allow easy access to their center for servicing the bait. The electrodes should tend not to collect snow and ice. Droplets of water or a coating of water should not easily cause electrical conduction between the electrodes and discharge the device.

None of the prior art provides such an electrode design.

SUMMARY

The present application discloses one or more of the features recited in the appended claims and/or the following features which, alone or in any combination, may comprise patentable subject matter:

In accordance with one embodiment, an electrode design comprises un-insulated metal electrodes that are straight, arranged vertically and spaced and sized to surround the bait.

Features of an embodiment of an improved electrode design for a deer repellent device will become apparent from a consideration of the ensuing drawings and description.

Additional features, which alone or in combination with any other feature(s), including those listed above and those listed in the claims, may comprise patentable subject matter and will become apparent to those skilled in the art upon consideration of the following detailed description of illustrative embodiments exemplifying the best mode of carrying out the invention as presently perceived.

BRIEF DESCRIPTION OF THE DRAWINGS

The detailed description particularly refers to the accompanying figures in which:

FIG. 4 is a top view of the head of the second embodiment of deer repellant device;

FIG. 5 is a side view of a second embodiment of a blunt the tip electrode;

FIG. 6 is a side view of a third embodiment of a blunt tip electrode;

FIG. 7 is a top view of the embodiment of a blunt tip electrode;

FIG. 8 is a side view of a fourth embodiment of a blunt tip electrode;

FIG. 9 is a top view of the fourth embodiment of a blunt tip electrode;

FIG. 10 is a side view of a fifth embodiment of a blunt tip electrode;

FIG. 11 is a top view of the fifth embodiment of a blunt tip electrode;

FIG. 12 is a side view of a sixth embodiment of a blunt tip electrode;

FIG. 13 is a top view of the sixth embodiment of a blunt tip electrode;

FIG. 14 is a side view of a seventh embodiment of a blunt tip electrode;

FIG. 15 is a top view of the seventh embodiment of a blunt tip electrode;

FIG. 16 is a side view of a eighth embodiment of a blunt tip electrode; and

FIG. 17 is a top view of the eighth embodiment of a blunt tip electrode.

DETAILED DESCRIPTION OF THE DRAWINGS

Figure 1:
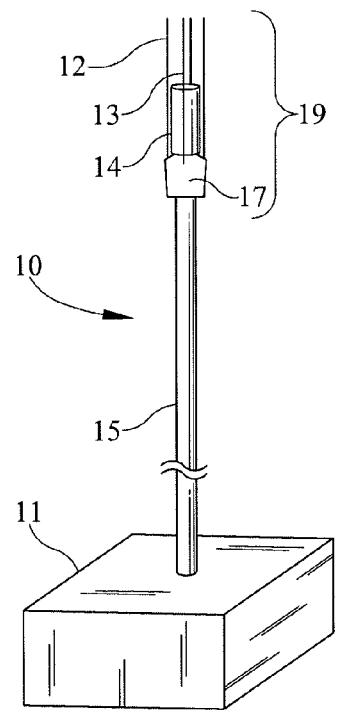
FIG. 1 shows a perspective view of a first embodiment of a deer repellant device.

FIG. 1 shows a first embodiment of a shock-producing deer repellent device 10 having a protective housing 11 enclosing a power supply and electronic components that maintain a predetermined voltage between straight, rigid, parallel, alternating positive electrodes 12 and negative electrodes 13 supported on a head 17 as shown in FIG. 1. The electrodes 12 and 13 with the head 17 to define a head assembly 19 as shown in FIG. 1. The four electrodes protrude vertically from the top of the device to surround the bait 14. The device has a stem 15 as support for the electrodes 12 and 13 the bait 14. Conductors (not shown) from the electronics in the protective housing 11 to the electrodes 12 and 13 are contained in the stem 15.

The housing 11 and stem 15 are made from a UV-stabilized, PVC plastic. The device 10 has a height that is approximately as tall as a deer's nose.

The electrodes 12 and 13 are made from un-insulated stainless steel spring wire of sufficient diameter and rigidity to prevent easy distortion. In this embodiment the electrode diameter is about 0.045 inches.

The bait can be an artificial scent as available from Agilex Flavors and Fragrances, Piscataway, N.J., or it can be a natural compound such as peanut butter.

The alternating positive and negative electrodes 12 and 13 are spaced close enough to ensure the deer will effectively contact both simultaneously, while being far enough apart to allow room for the bait and to avoid accidental contact between the electrodes. In this embodiment the four vertical electrodes are equally spaced around the bait describing a circle about one-half inch in diameter and with the positive and negative electrodes having about one-quarter inch between them.

The electrodes are of sufficient length to surround the bait but not so long that the ends can be pushed together easily. In this embodiment they are about one and a half inches long.

The electrodes are held vertically so that they cannot collect snow or ice and so water drains away quickly.

Figure 2:
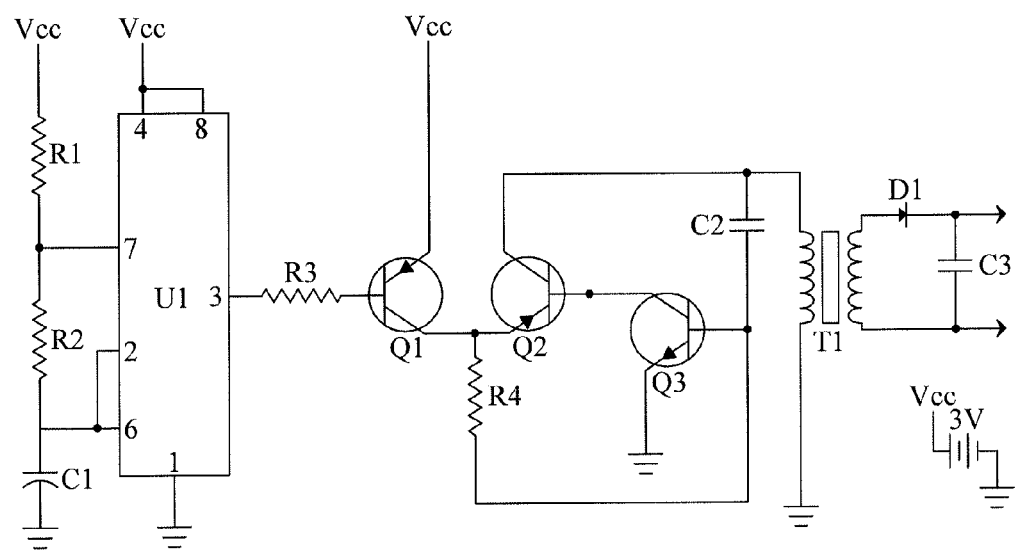
FIG. 2 shows a schematic drawing of a circuit and electronic components that can be used in this type of device.

FIG. 2 shows a schematic of a circuit that can be used to charge capacitor, C3, to about 360 volts when the input voltage, Vcc, is about 3.1 volts, and when transformer, T1, has a primary/secondary winding ratio of 1/138 with 27 primary windings. T1 has a 20 milliwatt power rating in this circuit at 14 KHz. The values of the resistors are: R1=2.7 M, R2=10 K, R3=470 K, and R4=33 K. The values of the capacitors are: C1=470 uf, 10 volt, electrolytic; C2=0.047 uf, 10 volt, ceramic; and C3=1.5 uf, 400 volt, metalized polyester. The transistors Q1 and Q2 are 2N2907, and Q3 is a 2N2222. The diode, D1, is a 1N4006. The timer, U1, is an ICM7555CN. The circuit shown in FIG. 2, with these component values, will charge the capacitor for 3.26 seconds with an interval of 14.7 minutes between charging pulses. The charging time, the charging interval, the capacitance of C3 and the voltage to which C3 is charged, are all variable and can be adjusted by changing the circuit components. The power supply for this circuit is 2 AA batteries in series. All components are ¼ watt, and all components are readily available except transformer, T1, which is custom made for this application.

Figure 3:
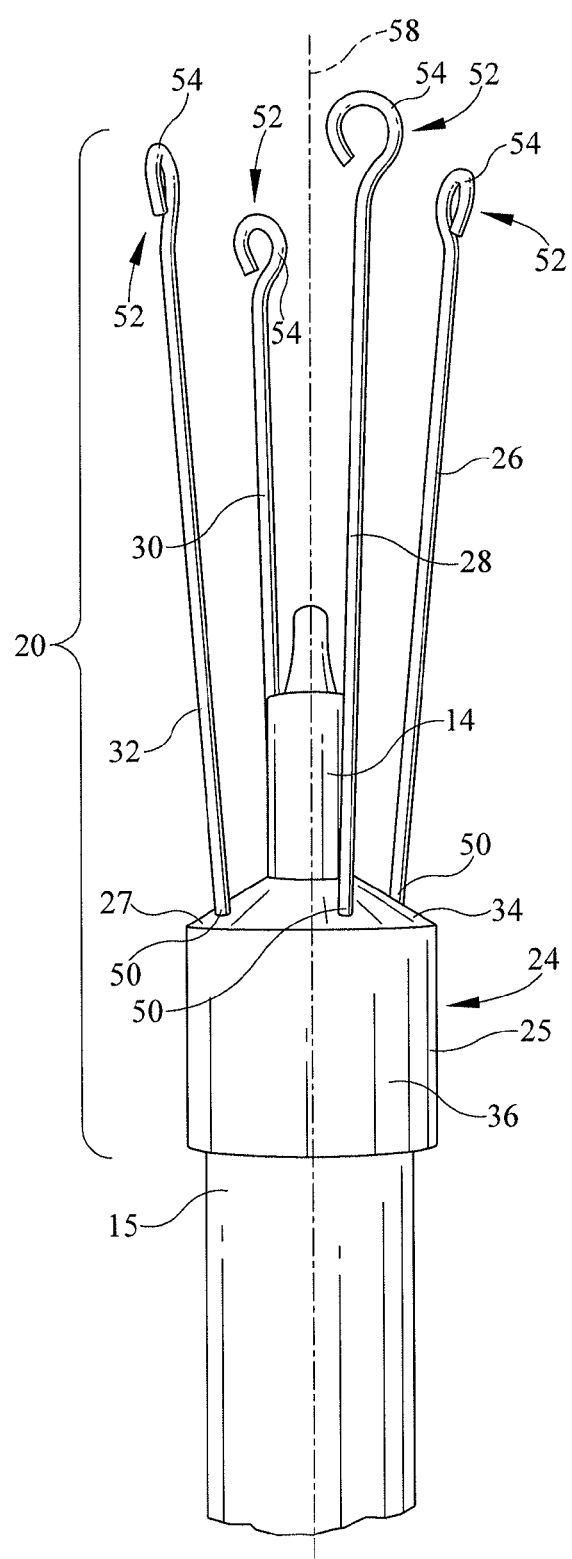
FIG. 3 is a perspective view of a head of a second embodiment of deer repellant device that includes a plurality electrodes positioned around a deer bait, the electrodes including a first embodiment of a treatment of the electrodes to blunt the tip of the electrodes.

In the embodiment of FIGS. 3 and 4, the head assembly 19 is omitted and a head assembly 20 is supported on the stem 15. The bait 14 is supported in a bait receiver 22 which is positioned on the top of a head 24. The head 24 has a body 25 that has a generally cylindrical surface 36 with an upper portion 27 of the body having a generally frustoconical surface 34. A pair of positive electrodes 26 and 32 are positioned on opposite sides of the body 24. A pair of negative electrodes 28 and 30 are interposed between the positive electrodes 26 and 32 and are also positioned on opposite sides of the body 24. Thus, each negative electrode is positioned between two negative electrodes and each negative electrode is positioned between two positive electrodes.

The electrodes 26, 28, 30, and 32 each have a fixed end 50 secured to the head 24 and a free end 52 that extends upwardly away from the base 24 with the structure of each electrode 26, 28, 30, and 32 being the same. Each free end 52 has a loop 54 formed therein. The loops 54 blunt the free ends 52 to reduce the potential for injury to an animal that attempts to access the bait 14. In this way, when an animal is startled by the electrical jolt from the electrodes 26, 28, 30, and 32, the animal's reflexive reaction to the jolt is less likely to result in the animal to impaling a portion of its mouth electrodes 26, 28, 30, and 32 as compared to the electrodes 12 and 13 of the device 10. This provides a more humane device than those known in the art.

Referring now to FIG. 4, it can be seen that the free ends 52 of the electrodes 26, 28, 30, and 32 are spaced apart by a distance 42 that is greater than the distance 40 between the fixed ends 50. This is a result of the electrodes 26, 28, 30, and 32 extending away from an axis 58 of the stem 15. Thus, the electrodes 26, 28, 30, and 32 diverge as they extend away from the head 24. The upwardly divergent electrodes 26, 28, 30, and 32 serve two purposes. The first is that they reduce the visual deterrence that an animal experiences when viewing the bait 14. The distance 42 reduces any visual impediment to the bait 14. Secondly, the divergent electrodes 26, 28, 30, and 32 provide an aesthetic that seems more natural, mimicking the shape of plants, such as the stamens of flowers, for example. This improves the opportunity for the animal to contact at least a portion of the bait 14 before receiving an electrical shock. Thus, the smell and taste of the bait 14 is associated with the negative reinforcement of the electrical shock as compared to devices which provide the shock without allowing the animal to taste the bait 14. Furthermore, the upwardly divergent electrodes 26, 28, 30, and 32 increase the accessibility of the bait 14 when being replaced.

The loops 54 of the embodiment of FIGS. 3-4 may be formed in a wire forming operation utilizing known methods such as a four-slide machine to apply the loops to the wires which forms the electrodes 26, 28, 30, and 32. FIGS. 5-17 illustrate several other embodiments of electrodes which have been blunted to reduce the potential for injury to an animal.

An electrode 60 includes a spherical head 61 supported on a wire 62 as shown in FIG. 5. The spherical head 61 is an electro-deposited solder which is applied by dipping the wire 62 into a solder bath.

Another embodiment of electrode 64 includes a hexagonal head 66 formed on the end of a wire 68 as shown in FIGS. 6-7. The electrode 64 is more suitable for applications requiring a stiffer electrode with electrode 64 being produced either in a cold heading operation or machine from hexagonal rod.

The embodiment of electrode 70 shown in FIGS. 8-9 includes a hemispherical head 72 secured to a wire 74. The electrodes 70 may also be formed from a machining operation or a cold heading operation.

A more complex electrode 76 has a body 78 having a first portion 80 which is generally spherical positioned on a on a larger annular portion 82 as shown in FIGS. 10-11. Electrode 76 may be used in applications where the electrodes are more closely spaced such that the wire 84 of electrode 76 fixed to the base 24 is more closely positioned to adjacent electrodes but the head 78 reduces the gap between the free ends of adjacent electrodes. Furthermore, the shape of head 78 tends to resemble the shape of an end of a stamen of a flower. The electrode 76 may be colored to mimic the colors of flowers to thereby increase the enticement to an animal.

The electrode 86 shown in FIGS. 12-13 has a circular head 88 positioned on a wire 90 which is relatively inexpensive to produce and provides a larger head reducing the gap between adjacent electrodes 86.

Electrode 92 of FIGS. 14-15 has a head 94 with an indentation 98 on an upper surface 99 of the head 94. The body 96 of electrode 92 has a simple cylindrical shape. The electrode 92 may be embodied as a finish nail as is known in the art or may be produced on similar equipment.

An embodiment of electrode 100 includes a removable head 102 which is threaded onto a body 104. Because the head 102 is removable, the electrode 100 may be configurable such that different size heads 102 may be placed on the body 104 to tailor the electrode 104 different applications.

Accordingly, it can be seen that the combination of features incorporated into the embodiment of electrodes for a deer repellent device described herein has all the advantages of the prior art without the disadvantages, and it can be seen that this embodiment solves problems associated with the prior art electrode designs used on this type of device with new and unobvious results that have not been produced by the prior art.

The description of an embodiment of electrodes for a deer repellent device contained herein is an exemplification of typical embodiments and is considered as illustrative of principles only. Even though this description may contain various specificities, these should not be construed as limitations on the scope of this embodiment. The electrodes for a deer repellent device could be of varying lengths and diameters. The electrodes can have varying composition of different metals or other conductors. The electrodes can be other than straight and there could be varying numbers of electrodes. This device can operate with various charging circuits and at a wide range of voltages. The power supply can be batteries, solar power, or other power sources. Other changes in size, color, materials, shape, form, function, and manner of operation, assembly, and use, are deemed readily apparent and do not depart from the scope of this embodiment of electrodes for a deer repellent device that is limited only by the appended claims and their legal equivalents rather than by the examples given.

Although certain illustrative embodiments have been described in detail above, variations and modifications exist within the scope and spirit of this disclosure as described and as defined in the following claims.

The invention claimed is:

1. A baited device for providing an electric shock to an animal comprises
   a base,
   a support extending upwardly from the base, and
   a head assembly including a head body formed to include a bait receiving space and a group of rigid and upwardly extending electrodes spaced about the head body, each electrode having a fixed end secured to the head body and a free end extending away from the head body, each electrode being expanded at the free end to blunt the free end of the electrode.

2. The baited device of claim 1, wherein the plurality of electrodes includes first and second positive electrodes and first and second negative electrodes, the fixed ends of the positive electrodes being positioned on opposite sides of the bait receiving space and the fixed ends of the negative electrodes being positioned such that each negative electrode is positioned adjacent a positive electrode about the bait receiving space, the first and second negative electrodes being positioned in the opposite sides of the bait receiving space.

3. The baited device of claim 2, wherein the free ends of each of the electrodes are formed in a loop.

4. The baited device of claim 2, wherein the electrodes are colored to mimic the color of a flower having a stamen having a shape that approximates the shape of the electrodes.

5. The baited device of claim 1, wherein the electrodes are colored to mimic the color of a flower having a stamen having a shape that approximates the shape of the electrodes.

6. A baited device for providing an electric shock to an animal comprises a head assembly including a head body formed to include a bait receiving space and a group of rigid and upwardly diverging electrodes spaced about the base, each electrode having a fixed end secured to the head body and a free end extending away from head body, each electrode being expanded at the free end to blunt the free end of the electrode.

7. The baited device of claim 6, wherein the free ends of each of the electrodes are formed in a loop.

8. The baited device of claim 6, wherein the electrodes are colored.

9. The baited device of claim 6, wherein the plurality of electrodes includes first and second positive electrodes and first and second negative electrodes, the fixed ends of the positive electrodes being positioned on opposite sides of the bait receiving space and the fixed ends of the negative electrodes being positioned such that each negative electrode is positioned adjacent a positive electrode about the bait receiving space, the first and second negative electrodes being positioned in the opposite sides of the bait receiving space.

10. A baited device for providing an electric shock to an animal comprises a body and a plurality of rigid and upwardly extending electrodes spaced about the body to define a bait receiving space between the plurality of upwardly extending electrodes, each of the plurality of electrodes having a fixed end secured to the body and a free end extending away from the body, each electrode being expanded at the free end to blunt the free end of the electrode.

11. The baited device of claim 10, wherein the plurality of electrodes includes first and second positive electrodes and first and second negative electrodes, the fixed ends of the positive electrodes being positioned on opposite sides of the bait receiving space and the fixed ends of the negative electrodes being positioned such that each negative electrode is positioned adjacent a positive electrode about the bait receiving space, the first and second negative electrodes being positioned in the opposite sides of the bait receiving space.

12. The baited device of claim 11, wherein the free ends of each of the electrodes are formed in a loop.

13. The baited device of claim 11, wherein the electrodes are colored to mimic the color of a flower having a stamen having a shape that approximates the shape of the electrodes.

14. The baited device of claim 10, wherein the electrodes are colored to mimic the color of a flower having a stamen having a shape that approximates the shape of the electrodes.

15. The baited device of claim 10, wherein the free ends of the electrodes are generally hemispherical.

16. The baited device of claim 10, wherein the free ends of the electrodes are define a generally circular structure having a diameter greater than a cross-sectional dimension of the remainder of the electrode.

* * * * *